United States Patent [19]

Nakagaki et al.

[11] 4,277,800
[45] Jul. 7, 1981

[54] COLOR TELEVISION SIGNAL GENERATING APPARATUS

[75] Inventors: Shintaro Nakagaki; Itsuo Takanashi, both of Yokohama; Koichiro Motoyama, Ninomiya; Tadayoshi Miyoshi; Sumio Yokokawa, both of Yokohama; Kenichi Miyazaki, Sagamihara, all of Japan

[73] Assignee: Victor Company of Japan, Ltd., Yokohama, Japan

[21] Appl. No.: 129,337

[22] Filed: Mar. 11, 1980

[30] Foreign Application Priority Data

Mar. 12, 1979 [JP] Japan ................. 54-28450

[51] Int. Cl.³ ............................................. H04N 9/07
[52] U.S. Cl. ..................................................... 358/44
[58] Field of Search .................. 358/44, 41, 43, 47, 358/48

[56] References Cited

U.S. PATENT DOCUMENTS

| | | | |
|---|---|---|---|
| 3,921,206 | 11/1975 | Bohm et al. | 358/44 |
| 3,935,588 | 1/1976 | Uno | 358/44 |
| 4,104,679 | 8/1978 | Kitamura et al. | 358/44 |

Primary Examiner—Richard Murray

[57] ABSTRACT

A color television signal generating apparatus comprises a color-resolving striped filter, in a camera tube, for separating the output signal of the camera tube into required signals. The output of the camera tube is a superimposed signal comprising a direct wave signal containing signals of the three primary colors of said addition mixture color, and a high-band signal component comprising a group of modulated color signals resulting from an amplitude modulation of a carrier wave by the signals of two primary colors other than the primary color of the light transmitted through said first filter stripe, said carrier wave having a frequency equal to a space frequency determined by the number of said groups of filter stripes, and said carrier wave also having frequency components which are higher harmonics of the frequency of said carrier wave. The color television signal generating apparatus further comprises a first separation circuit for separating and deriving, out of the output signal of the camera tube, a fundamental wave component signal in which the carrier wave having the frequency equal to the space frequency is amplitude modulated, a second separation circuit for separating and deriving, out of the output signal of the camera tube, a second harmonics wave component signal in which a carrier wave having a frequency twice the space frequency is amplitude modulated, a multiplication circuit for multiplying the output signals of the first and second separation circuits, and a circuit for separating and deriving signals of two primary colors other than the primary color transmitted through the first filter stripe, responsive to the output signals of the multiplication means and the first separation circuit.

7 Claims, 10 Drawing Figures

COLOR TELEVISION SIGNAL GENERATING APPARATUS

BACKGROUND OF THE INVENTION

The present invention relates generally to color television signal generating apparatuses and more particularly to a color television signal generating apparatus comprising a camera tube, a color-resolving striped filter provided on the camera tube, and a circuit for processing a signal obtained from the camera tube.

Among the simple types of known color television cameras, there is a so-called single-tube type in which a single pickup or camera tube, having a color-resolving striped filter in its optical system, is used to generate luminance signals and color signals. Also, a color television camera has two tubes in one pickup or camera tube. On tube is used for generating luminance signals, and the other tube has a color-resolving striped filter within its optical system to generate color signals.

In either type of the above mentioned color television cameras, the color-resolving striped filters are of the phase-separation or the frequency-separation system.

In a color-resolving striped filter of the phase-separation type, however, there has been the disadvantageous requirement that the color-resolving striped filter have a complicated organization, including index stripes. Another disadvantageous requirement is that a complicated has been required for generating sampling pulses on the basis of information obtained from these index stripes. A further problem is that noise results in the conversion of color information signals by a "sampling hold" of a dot-sequential system. In this system, a signal is obtained by sampling and inadvertently introducing noise of high frequency into simultaneous color information signals included in the dot-sequential. The color information signals become stretched along the time axis and are converted into noise of conspicuously low frequency, whereby the signal-to-noise ratio becomes low.

A color-resolving striped filter of the frequency-separation system does not encounter the above described difficulties accompanying a known color-resolving striped filter of the phase-separation system. However, there are interference fringes (moire), due to various causes, since two sheets of striped filters of different space frequency values are fabricated in combination. In addition, the frequency fluctuation of a carrier wave generated in the output signal, as a result of non-linearity of the deflection system of the camera tube, is a large problem. Often, there are further difficulties, such as shading due to a difference in degrees of modulation, at the peripheral region and the central region in the target surface of the camera tube.

The present applicant has previously developed a novel "Color television signal generating apparatus" which overcomes the above described disadvantages by U.S. Pat. No. 4,041,528. This previously developed color television signal generating apparatus comprises a color-resolving striped filter, in a camera tube, for separating the output signal of the camera tube into required signals. Detecting means detects the envelopes of specific positive wave and negative wave signals thus separated. The output of the camera tube is a superimposed signal of a direct wave signal containing signals of three primary colors, of additional mixed colors, and a high-band component signal comprising a group of modulated color signals. This camera output signal results from the amplitude modulation of a carrier wave responsive to filter stripes in the color-resolving striped filter. The carrier wave components have a higher harmonic relation relative to two primary color signals. The separating means comprises first separating means for separating the direct signal from the above mentioned superimposed signal and second separating means for separating the high-band component signal. The envelope detecting means comprises a first detector for producing a demodulated output signal in accordance with an envelope resulting from a successive connection of peak values of the positive wave of the thus separated high-band component signal. A second envelope detection means produces a demodulated output signal in accordance with an envelope resulting from a successive connection of peak values of the negative wave of the thus separated high-band component signal.

The apparatus described above has the following advantageous features.

Since a filter comprising filter stripes of respectively equal space frequency are used for the color-resolving striped filter, moire does not occur. Since the system is not a phase separation system, stripes are not necessary for generating index pulses in the color-resolving striped filter, the camera tube, and other parts. Therefore, the color-resolving striped filter and the camera tube become simple and can be readily fabricated. Furthermore, since the rate of utilization of the incident light is improved, a bias light is unnecessary. By adjusting the spectral response characteristics of the filter stripes of the color-resolving striped filter and the spectral response characteristics of the camera tube, the output levels of the three primary color signals respectively become equal when there is a pick up of an all-color light (white light). It is easy to reduce the shading which is due to the modulation degree characteristic of the camera tube. The positive and the negative waves of the high-band component signal are, respectively, envelope detected to obtain two 2-color mixture signals. Thus, it is possible to provide a color television signal generating apparatus with an excellent performance, which is simple and can be produced at low cost.

However, in the case where the above mentioned color-television signal generating apparatus is applied to a color-television camera in which the frequency band necessary for signals and the frequency of the carrier wave are not well separated as in a small size color-television camera of simplified type, it is difficult to obtain a perfect envelope, whereby a mean value component is included, and a color error results. This has been a problem encountered heretofore. In the above mentioned apparatus, furthermore, the second harmonic component is used as it is in the color demodulation. In general, however, with respect to the characteristics of a camera tube, there is a difference between the degrees of modulation of the peripheral part and the central part of the target surface. In addition, the deterioration of the second harmonic wave frequency component in the peripheral part of the target surface is greater than that of the fundamental wave frequency component. Consequently, this gives rise to a problem in that a color shading effect is produced.

Still another problem is caused by the fact that the second harmonic wave frequency component affects the focus stability more than the fundamental wave frequency component. Since, in above described apparatus, the second harmonic wave frequency component is used for color demodulation, there has been the problem of poor focus stability. A further problem has been that the effect of noises of the second harmonic wave frequency band is not negligible and gives rise to poor S/N ratio and other difficulties.

SUMMARY OF THE INVENTION

Accordingly, it is a general object of the present invention to provide a new and useful color television signal generating apparatus in which the above described difficulties and problems are overcome and solved.

Another object of the invention is to provide a color television signal generating apparatus so constituted and adapted that, in the operation of forming an image on the photoconductive screen (or photoelectric screen) of a camera tube with light picked up from a camera object and passed through an optical color-resolving striped filter and separating and generating specific two primary color signals from the fundamental wave component of the carrier wave having a space frequency determined by the number of sets of filter stripes in the above mentioned optical color-resolving striped filter of the signals led out from this camera tube and from the second harmonic wave component of this carrier wave, the amplitude component of the second harmonic wave component is prevented from being used, and only the phase component thereof is used.

In accordance with the apparatus of the present invention, the occurrence of color shading due to the above mentioned second harmonic wave component can be eliminated. Furthermore, by mean-value detection, the two primary color signals can be separated and generated. In addition, primary color signals of good S/N ratio can be generated with almost no effect of noise due to the second harmonic wave component, whereby color television signals of excellent picture quality can be generated.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 8(A) through FIG. 8(I) show respectively waveforms of signals at respective parts in the block diagram shown in FIG. 6 under specific conditions.

DETAILED DESCRIPTION

Figure 1:
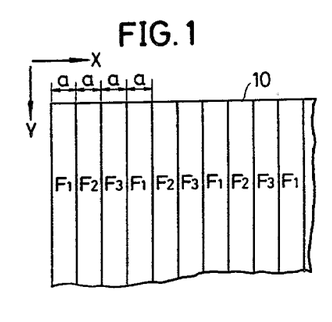
FIG. 1 is an enlarged, fragmentary frontal view of one embodiment of a color-resolving striped filter for use in the color television signal generating apparatus of the present invention.

One embodiment of a color-resolving striped filter for use in the apparatus of the present invention is illustrated in FIG. 1. The color-resolving striped filter 10 is made up of first, second, and third filter stripes F1, F2, and F3 of equal widths a. Each stripe has an oblong, narrow shape in the vertical direction. The stripes are laid consecutively and contiguously in the order named above, stripes F1, F2, and F3 constituting one group. A plurality of such groups are laid consecutively and contiguously side-by-side in a single place. These filter stripes F1, F2 and F3, of all groups, extend in the direction (direction Y in FIG. 1) which is perpendicular to the horizontal scanning direction (direction X in FIG. 1). The stripes are arrayed in an orderly manner in the above mentioned sequence, and all filter stripes have the same space frequency.

The light transmitting characteristics respectively of these filter stripes F1, F2 and F3 are as follows. The first filter stripe F1 is adapted to transmit light of one primary color from among the three primary colors (red, green, and blue) of addition mixed colors. The second filter stripe F2 is adapted to transmit light of mixed colors of the primary color transmitted through the first filter stripe and one of the two remaining primary colors (i.e. not the primary color transmitted through the first filter stripe). The third filter stripe F3 is adapted to transmit the light of all colors (e.g. white light).

More specifically, the second filter stripe F2 is capable of transmitting light of colors respectively having the following relationships, depending on whether the primary color transmitted through the first filter stripe F1 is red, green or blue.

| Primary color light transmitted through first filter stripe F1 | Color of light transmitted through second filter stripe F2 |
|---|---|
| red light | magenta (red blue) or yellow (red green) |
| green light | yellow (red green) or cyan (blue green) |
| blue light | magenta (red blue) or cyan (blue green) |

In one example of a color-resolving striped filter 10 of the above described organization, the first filter stripe F1 is adapted to have a transmission characteristic I (FIG. 2) to transmit green light (G). The second filter stripe F2 is adapted to have a transmission characteristic II to transmit the light of a mixture color of blue light (B) and green light (G) (that is, cyan (C)). The third filter stripe F3 is adapted to have a transmission characteristic III to transmit the light of all colors, that is, white light (W) or a mixed color light of red light (R), green light (G), and blue light (B).

Figure 3:
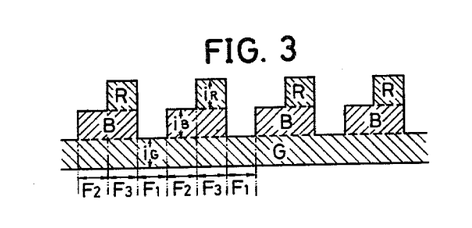
FIG. 3 is a diagram indicating the energy distribution of transmitted light when white light is projected onto the color-resolving striped filter shown in FIG. 1.

If these filter stripes F1, F2, and F3 have such light transmitting characteristics, the energy state of the light transmitted when a white light (W) is projected onto the color-resolving striped filter 10 is as illustrated by one example in FIG. 3, in which the horizontal direction (X-axis direction) represents energy distribution. That is, green light (G) is continuously distributed since it is transmitted through all filter strips F1, F2 and F3. Blue light (B) is distributed over a width 2a separated by space intervals a, since it only passes through the filter stripes F2 and F3. Red light (R) is distributed over a width a separated by space intervals of 2a since it is only transmitted through the filter stripe F3.

A color television signal generating apparatus previously developed, in which the above described color-resolving striped filter 10 is used will now be described with respect to one example thereof and with reference to FIG. 4. This color-resolving striped filter and the previously developed color television signal generating apparatus are described in detail in the specification of U.S. Pat. No. 4,041,528.

Figure 4:
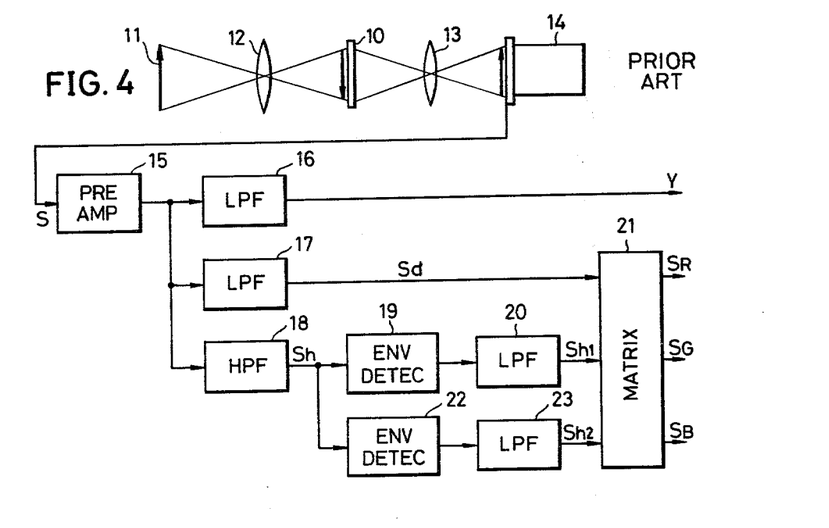
FIG. 4 is a combined optical and block diagram illustrating one embodiment of a previously developed color television signal generating apparatus.

In the apparatus diagrammatically represented in FIG. 4, the image light from an object 11 to be televised passes through the camera lens 12 of a single tube type color television camera and forms an image on the color-resolving striped filter 10. The optical image thus formed on this filter 10 is transmitted by way of a relay lens 13 and forms an image on the photoconductive surface (or photoelectric surface) of a camera tube 14.

Figure 2:
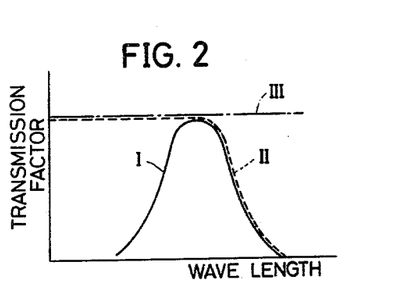
FIG. 2 is a graphical representation indicating the transmission characteristics of respective filter stripes of a color-resolving striped filter shown in FIG. 1.

When a color-resolving, striped filter 10 of the characteristic indicated in FIG. 2 is used, and a white light image is introduced as incident light passing through the camera lens 12, the resulting output signal S obtained from the camera tube 14. This light can be represented as a fundamental wave component having a fundamental repetitive period described by the pitch of the respective stripes of the color-resolving striped filter.

The output signal S is also represented as S=Sd+Sh where the signal Sd is a direct wave (DC component) signal comprising a mixture of a luminance signal Y, a green light signal SG, a blue light signal SB, and red light signal SR.

The signal Sh is a high-band component (AC component) signal comprising a group of modulated color signals having forms resulting from amplitude modulation of specific carrier wave and other carrier waves with a mixture signal. The specific carrier wave has a frequency which is the same as the space frequency determined by the number of groups of filter stripes F1, F2 and F3 of the color-resolving striped filter 10. The other carrier waves have frequencies which are the same as higher harmonics of the specific carrier wave. The mixture signal is made up of two primary colors other than the primary (which is green color light in the instant example) passing through the first filter stripe F1.

The above mentioned output signal S of the camera tube 14 is amplified by a preamplifier 15. Then, it is supplied to low-pass filters 16 and 17 and a high-pass filter 18. The low-pass filter 16 has a filtering characteristic shown by curve IV (FIG. 5), which is an upper-limit cut-off frequency fy of approximately 2.5 MHz. A luminance signal Y is derived from the output signal of filter 16 (curve IV). The low-pass filter 17 has a filtering characteristic shown by curve V, with an upper-limit cut-off frequency fc of approximately 0.5 MHz, from which the above mentioned direct signal Sd is derived.

Figure 5:
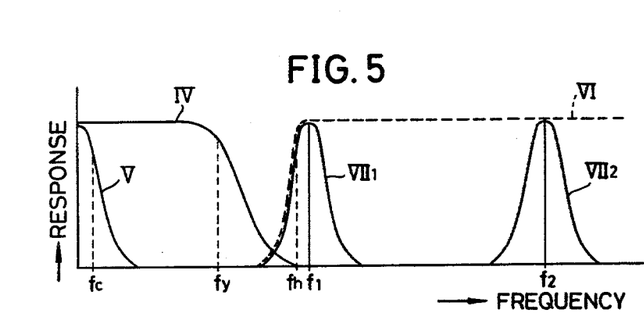
FIG. 5 is a graphical representation indicating the frequency responses of the output signal of a camera tube and the filtering characteristic of a filter in the apparatus shown in FIG. 4.

The high-pass filter 18 has a filtering characteristic shown by curve VI with a lower-limit cut-off frequency fh. The above mentioned high-band component signal Sh shown by characteristic curves $VII_1$ and $VII_2$ is derived from the signal of curve VI.

In FIG. 5, frequency f1 indicates a carrier wave of a frequency which is determined by the number and space frequency of filter stripe groups of the color-resolving striped filter 10, this frequency being approximately 3.25 MHz, for example, when there are 170 groups of the filter stripes. The frequency f2 indicates the second harmonics (of approximately 6.5 MHz) of the carrier wave of the above mentioned frequency f1.

If a color-resolving striped filter having the characteristic indicated in FIG. 3 is used, only a modulated color signal having a component of the signal SB due to blue light B and a modulated color signal having a component of the signal SR due to red light R exist in the signal Sh. A signal component due to green light G is not contained therein. The angular frequencies $\omega$ and $2\omega$ and the above mentioned frequencies f1 and f2 have the relationships $\omega = 2\pi f1$ and $2\omega = 2\pi f2$.

The high-band component signal Sh which has been derived from the high-pass filter 18 is supplied respectively to envelope detector circuits 19 and 22, where the positive wave and negative wave, respectively, are envelope detected. The output demodulated signals of the envelope detector circuits 19 and 22 are supplied to a matrix circuit 21 by way of low-pass filters 20 and 23, as signals Sh1 and Sh2. The matrix circuit 21 receives these signals Sh1 and Sh2 together with the direct-wave signal Sd from the low-pass filter 17. As a result, the matrix circuit 21 produces three primary color output signals SG, SR, and SB for green, red, and blue.

While the above described apparatus had characteristics as described hereinbefore, it was accompanied, on the other hand, by the problems described hereinbefore. Accordingly, the present invention provides an apparatus in which the above mentioned problems have been solved, and which will now be described below with respect to preferred embodiments thereof.

Figures 6, 7:
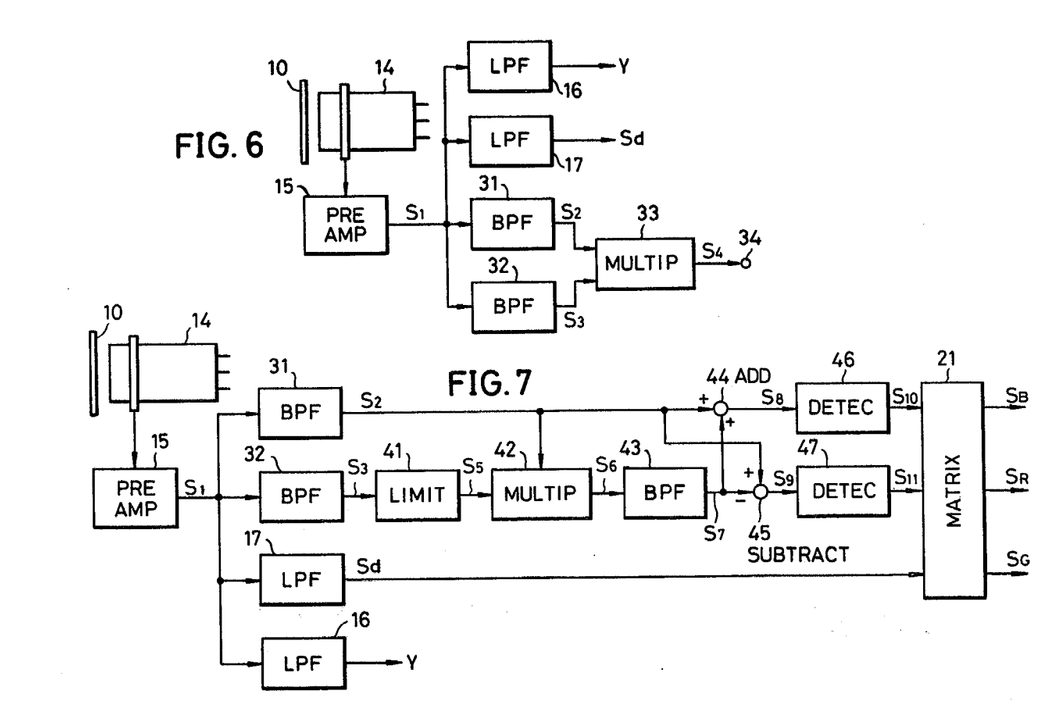
FIG. 6 is a combined optical and block diagram showing a fundamental organization of the color television signal generating apparatus, according to the invention.
FIG. 7 is a block diagram showing a first embodiment of the color television signal generating apparatus according to the invention.

A general block schematic diagram of fundamental organization of the color-television signal generating apparatus according to the present invention is shown in FIG. 6. In this apparatus, the output signal of a camera tube 14 in front of which a color-resolving striped filter 10 of the aforedescribed constitution is disposed is passed through a preamplifier 15 and supplied to band-pass filters 31 and 32. The output signal $S_1$ of the preamplifier 15 is represented by the following equation.

$$S_1 = (i_G + \tfrac{2}{3} i_B + \tfrac{1}{3} i_R) + A\sin(\omega t + \phi) + \frac{A}{2}\sin(2\omega t - \phi) + \ldots \quad (1)$$

where $A = -\dfrac{\sqrt{3}}{\pi}(i_B^2 + i_B i_R + i_R^2)^{\frac{1}{2}}$ $\phi = \tan^{-1}\dfrac{i_B - i_R}{\sqrt{3}\,(i_B + i_R)}$ $\omega = 2\pi f1$ (where f1 is a space frequency determined by three filter stripes of the color-resolving striped filter 10.)

The waveform of the output signal $S_1$ of the preamplifier 15 with the characteristics of the degree of modulation of the camera tube in the ideal state of 100 percent for all frequencies becomes as shown in FIG. 3, and the levels become $i_G$ for the filter stripe F1, $i_G + i_B$ for the filter stripe F2, and $i_G + i_B + i_R$ for the filter stripe F3.

These levels $i_G$, $i_B$, and $i_R$ correspond to the necessary three primary color signals.

In the case where the characteristic of the degree of modulation of the camera tube is not evenly flat, amplitude correction of each frequency band in each term in Eq.(1) is carried out.

The band-pass filter 31 passes the above mentioned frequency f1 and frequency components in the vicinity thereof, while the band-pass filter 32 passes the frequency 2f1 (=f2) and the frequency components in the vicinity thereof. As a consequence, a fundamental wave component signal $S_2$ is obtained with the wave filtering characteristic indicated by the curve $VII_1$ in FIG. 5 from the band-pass filter 31, while a second harmonic wave component signal $S_3$ is obtained with the wave filtering characteristic indicated by the curve $VII_2$ in the same graph from the band-pass filter 32. These signals $S_2$ and $S_3$ are represented by the following equation.

$$S_2 = A \sin(\omega t + \phi) \quad (2)$$

$$S_3 = \frac{A}{2} \sin(2\omega t - \phi) \quad (3)$$

These signals $S_2$ and $S_3$ are respectively supplied to a multiplication circuit 33, where they are multiplied and rendered into a signal $S_4$, which is represented by the following Eq.(4), and which is thereafter led out through an output terminal 34.

$$S_4 = S_2 \times S_3 \quad (4)$$
$$= \frac{A^2}{4}\{-\cos 3\omega t + \cos(\omega t - 2\phi)\}$$

The first term on the right-hand side of Eq.(4) is a signal whose phase will not vary depending on color. The second term on the right-hand side is a signal which is of the same frequency as the signal $S_2$, and which, moreover, is of a phase that deviates with double quantity in the direction opposite to that of the signal $S_2$ depending on the color. Since these signals of the first and second terms of the right-hand side of Eq.(4) are of respectively different frequencies, they can be readily separated. This can be used to obtain a blue (B) signal and a red (R) signal as described hereinafter.

The above mentioned signal $S_1$ is supplied to low-pass filters 16 and 17. As a result, a luminance signal is obtained by the low-pass filter 16 of a frequency pass-band indicated by curve IV in FIG. 5, while a direct (DC) signal (a three-color mixed signal) $S_d$ is obtained by the low-pass filter having a frequency pass-band indicated by curve V in FIG. 5.

In the present invention, particular attention was directed to the output signal $S_4$ of the multiplication circuit 33. Two embodiments of the invention in the case where the signal component of the second term on the right-hand side of Eq. (4) is used and one embodiment in the case where the signal component of the first term on the right-hand side is used will now be described.

FIG. 7 is a block schematic diagram of a first embodiment of the apparatus of the present invention. In FIG. 7, those parts which are the same as corresponding parts in FIG. 6 are designated by like reference numerals and characters. Description of such parts will be omitted.

The output signal $S_3$ of the band-pass filter 32 is supplied to an amplitude limiter 41, where it is rendered into a signal $S_5$ of continually constant amplitude, which is then supplied to a multiplication circuit 42. This constant-amplitude signal $S_5$ is represented by the following equation $$S_5 = -\sin(2\omega t - \phi) \quad (5)$$

Then, when the relationship $$X = \frac{i_B - i_R}{\sqrt{3}\,(i_B + i_R)} \text{ is used,}$$

Eq. (5) becomes $$S_5 = -\sin(2\omega t - \tan^{-1} X) \quad (6)$$

The above mentioned multiplication circuit 42 multiplies the above mentioned signal $S_5$ of constant amplitude and the signal $S_2$ from the band-pass filter 31 to produce as output a product signal $S_6$. This output product signal $S_6$ is represented by the following equation.

$$S_6 = \frac{\sqrt{3}}{2\pi}(i_B{}^2 + i_R{}^2 + i_B i_R)^{\frac{1}{2}}\{-\cos 3\omega t + \cos(\omega t - 2\tan^{-1} X)\} \quad (7)$$

The above signal $S_6$ is supplied, through a band-pass filter 43 in which only its fundamental wave component is passed, to an addition circuit 44, as a signal $S_7$, where it is added to the signal $S_2$ from the band-pass filter 31. On the other hand, the output signal of the band-pass filter 43 is supplied to a subtraction circuit 45, where it undergoes subtraction with the above mentioned signal $S_2$. The signal $S_7$ passes through the band-pass filter 43 at this time is represented by the following equation.

$$S_7 = \frac{\sqrt{3}}{2\pi}(i_B{}^2 + i_R{}^2 + i_B i_R)^{\frac{1}{2}}\cos(\omega t - 2\tan^{-1} X) \quad (8)$$

The above mentioned addition circuit 44 multiplies the signal $S_2$ by $-\pi/\sqrt{3}$ and the signal $S_7$ by $2\pi/\sqrt{3}$ and multiplies the resulting signals to produce a signal $S_8$ as output. The above mentioned subtraction circuit 45 subtracts a signal which is $2\pi/\sqrt{3}$ times the signal $S_7$ from a signal which is $-\pi/\sqrt{3}$ times the signal $S_2$ and produces the difference signal $S_9$ as output. Accordingly, these output signals $S_8$ and $S_9$ are respectively represented by the following formulas.

$$\begin{aligned}S_8 &= (i_B{}^2 + i_R{}^2 + i_B i_R)^{\frac{1}{2}}\sin(\omega t + \tan^{-1} X) \\&\quad + (i_B{}^2 + i_R{}^2 + i_B i_R)^{\frac{1}{2}}\cos(\omega t - 2\tan^{-1} X) \\&= (i_B{}^2 + i_R{}^2 + i_B i_R)^{\frac{1}{2}}\{\sin\omega t \cdot \cos(\tan^{-1} X) + \cos\omega t \cdot \sin(\tan^{-1} X) + \cos\omega t \cdot \cos(2\tan^{-1} X) + \sin\omega t \cdot \sin(2\tan^{-1} X)\} \\&= (i_B{}^2 + i_R{}^2 + i_B i_R)^{\frac{1}{2}}\{(\frac{1}{\sqrt{1+X^2}} + \frac{2X}{1+X^2})^2 \\&\quad (\pm\sqrt{\frac{X^2}{1+X^2} + \frac{1-X^2}{1+X^2}})^2\}^{\frac{1}{2}} \times \sin(\omega t + \phi_1)\end{aligned} \quad (9)$$

$$\begin{aligned}S_9 &= (i_B{}^2 + i_R{}^2 + i_B i_R)^{\frac{1}{2}}\{(\frac{1}{\sqrt{1+X^2}} - \frac{2X}{1+X^2})^2 + \\&\quad (\pm\sqrt{\frac{X^2}{1+X^2} - \frac{1-X^2}{1+X^2}})^2\}^{\frac{1}{2}} \times \sin(\omega t + \phi_2)\end{aligned} \quad (10)$$

Here, the ± symbols in these Eq. (9) and Eq. (10) assume the following values.

+when $i_B > i_R$
−when $i_B < i_R$

The above described signals $S_8$ and $S_9$ are respectively supplied to detection circuits 46 and 47.

The detection circuits 46 and 47 can detect the signals $S_8$ and $S_9$ by envelope detection or square detection, of course, and also by mean-value detection.

More specifically, in the previously developed apparatus described hereinbefore, a high-frequency band component signal comprising the fundamental wave $S_2$ and a higher harmonic wave component such as the second harmonic wave component $S_3$ is detected. The peak value on the positive side against the alternating-current zero level and the peak value on the negative side of this high-frequency band component signal differ depending on the color. Moreover, the waveform is such that the mean values on both positive and negative sides are equal. For this reason, only envelope detection could be carried out.

In contrast, in apparatus of the present invention, a product output signal of the signal $S_2$ and the signal $S_3$ is obtained by the multiplication circuit 42, and as a result, with single carrier signals such as the signals $S_8$ and $S_9$ of Eqs. (9) and (10), a signal whose amplitude changes with color is detected. For this reason, mean value detection also can be carried out.

The detection output signals $S_{10}$ and $S_{11}$ of the detection circuits 46 and 47 are respectively supplied to a matrix circuit 21. These detection output signals $S_{10}$ and $S_{11}$ are represented by the following equations under the indicated conditions (1) When $i_B > i_R$, $$S_{10} = (i_B^2 + i_R^2 + i_B i_R)^{\frac{1}{2}}\{(\frac{1}{\sqrt{1+X^2}} + \frac{2X}{1+X^2})^2 \quad (11)$$

$$+ (\sqrt{\frac{X^2}{1+X^2}} + \frac{1-X^2}{1+X^2})^2\}^{\frac{1}{2}}$$

$$S_{11} = (i_B^2 + i_R^2 + i_B i_R)^{\frac{1}{2}}\{(\frac{1}{\sqrt{1-X^2}} - \frac{2X}{1+X^2})^2 \quad (12)$$

$$+ (\sqrt{\frac{X^2}{1+X^2}} + \frac{1-X^2}{1+X^2})^2\}^{\frac{1}{2}}$$

(2) When $i_B < i_R$, $$S_{10} = (i_B^2 + i_R^2 + i_B i_R)^{\frac{1}{2}}\{(\frac{1}{\sqrt{1+X^2}} + \frac{2X}{1+X^2})^2 \quad (13)$$

$$+ (-\sqrt{\frac{X^2}{1+X^2}} + \frac{1-X^2}{1+X^2})^2\}^{\frac{1}{2}}$$

$$S_{11} = (i_B^2 + i_R^2 + i_B i_R)^{\frac{1}{2}}\{(\frac{1}{\sqrt{1+X^2}} - \frac{2X}{1+X^2})^2 \quad (14)$$

$$+ (-\sqrt{\frac{X^2}{1+X^2}} + \frac{1-X^2}{1+X^2})^2\}^{\frac{1}{2}}$$

$$X = \frac{i_B - i_R}{\sqrt{3}(i_B + i_R)}$$

The above signal $S_{10}$ s a blue (B) signal, while the above signal $S_{11}$ is a red (R) signal.

The values for various special conditions are determined as follows.

(1) when $i_B = i_R = i$, $S_{10} = S_{11} = \sqrt{6i} = 2.45i$ ($X = 0$)
(2) when $i_B = i$, $i_R = 0$, $S_{10} = 2i$, $S_{11} = 0$ ($X = 1/\sqrt{3}$)
(3) when $i_B = 0$, $i_R = i$, $S_{10} = 0$, $S_{11} = 2i$ ($X = -1/\sqrt{3}$)

From above, it is evident that the signals $S_{10}$ and $S_{11}$ are respectively separated into a blue signal and a red signal.

The various signal waveforms under the above stated special conditions are respectively indicated in FIGS. 8(A) through 8(I).

Figure 8:
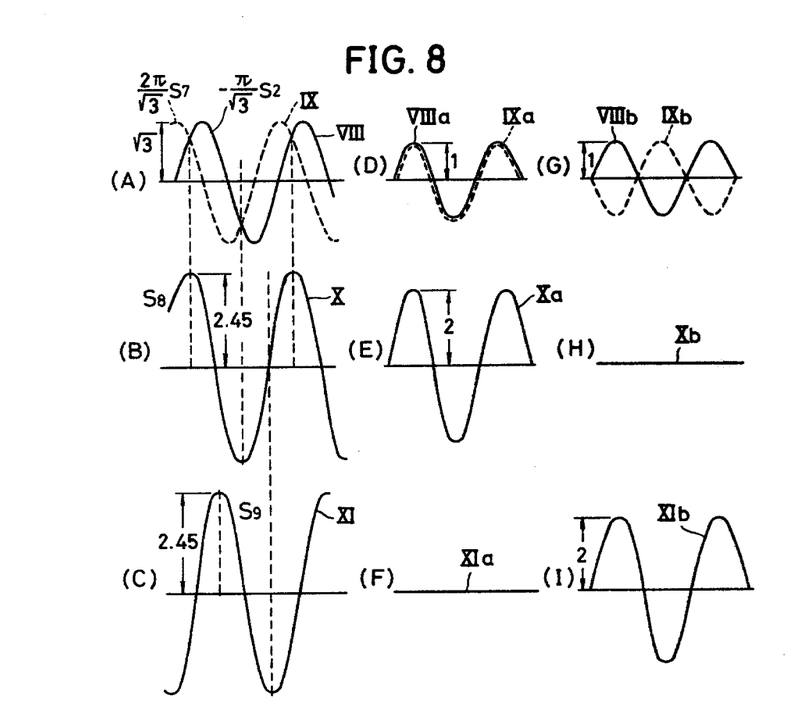

At the time of the above condition (1) of $i_B = i_R = i$, that is, at the time when a white light or a magenta light from the object being picked up is passed through the optical color-resolving striped filter 10 are introduced into the camera tube 14, the waveform of the signal $-\pi S_2/\sqrt{3}$ becomes as indicated by curve VIII in FIG. 8(A), while the waveform of the signal $2\sqrt{S_7}/\sqrt{3}$ becomes a signal of different phase at the same level as indicated by curve IX in FIG. 8(A). Furthermore, the waveform of the signal $S_8$ at this time becomes as indicated by curve X in FIG. 8(B), while the waveform of the signal $S_9$ becomes as indicated by curve XI in FIG. 8(C).

At the time when the light from the object is a blue light, this corresponds to the above condition (2) of $i_B = i$, $i_R = 0$. And the signals $-\pi S_2/\sqrt{3}$ and $2\pi S_7/\sqrt{3}$ both become as indicated at VIIIa and IXa in FIG. 8(D), becoming of the same phase at the same level. Furthermore, the signals $S_8$ and $S_9$ at this time become respectively as indicated at Xa and XIa in FIGS. 8(E) and 8(F), and only the signal $S_8$ is led out, the signal $S_9$ becoming zero.

On the other hand, at the time when the light from the object is a red light, this corresponds to the above condition condition (3) of $i_B = 0$, $i_R = i$, and the signals $-\pi S_2/\sqrt{3}$ and $2\pi S_7/\sqrt{3}$ both become as indicated at VIIIb and IXb in FIG. 8(G), becoming of opposite phase at the same level. Consequently, the signal $S_8$ becomes zero as indicated at Xb in FIG. 8(H), but the signal $S_9$ becomes as indicated at XIb in FIG. 8(I), and a red (R) signal of a specific level is led out.

As is apparent from FIGS. 8(A) through 8(I), the levels of the signals $S_8$ and $S_9$ differ with whether the objective pick-up light is a white or magenta light or whether it is a blue or red light, but the difference between their levels is slight and does not give rise to any problem in actual practice.

Next, the effectiveness of improvement of the S/N ratio of the above described first embodiment of the invention will be described.

In the study of the S/N ratio, the noise may be considered as a group of a plurality of single carrier wave noises. Further, the total noise may be considered with the integrated value of the plurality of single carrier wave noises within the frequency band used. Furthermore, particularly in the case where a comparison is to be made with a known system, an equivalent comparison can be made by a comparison mutually between single carrier wave noises. Therefore, by considering the noise as a single carrier wave noise and representing the noise $e_{n1}$ in the fundamental wave component band by $E_{n1} \sin \omega_{n1} t$ and the noise $e_{n2}$ in the second harmonic wave component band by $E_{n2} \sin \omega_{n2} t$, the output signals $S_{2n}$ and $S_{3n}$ of the band-pass filters 31 and 32 of the apparatus shown in FIG. 7 in the case where noise is considered can be represented by the following equations.

$$S_{2n} = S_2 + e_{n1} \quad (15)$$
$$= A\{1 + X_1\cos(\omega t + \phi - \omega_{n1}t)\} \cdot$$
$$\sin\{\omega t + \phi - X_1\sin(\omega t + \phi - \omega_{n1}t)\}$$
$$S_{3n} = S_3 + e_{n2} \quad (16)$$
$$= \frac{A}{2}\{1 + X_2\cos(2\omega t - \phi - \omega_{n2}t)\} \cdot$$
$$\sin\{2\omega t - \phi - X_2\sin(2\omega t - \phi - \omega_{n2}t)\}$$

Here, $X_1 = E_{n1}/A$ and $X_2 = E_{n2}/\frac{A}{2}$.

The signal $S_{3n}$ of Eq. (16) is rendered into a signal of constant amplitude by the amplitude limiter 41. This output signal $S_{5n}$ is expressed by the following equations.

$$S_{5n} = -\sin\{2\omega t - \phi - X_2 \sin(2\omega t - \phi - \omega_{n2}t)\} \quad (17)$$

Furthermore, when $$\omega_{c1}t = \omega t - \omega_{n1}t, \quad \omega_{c2}t = 2\omega t - \omega_{n2}t,$$

the output signal $S_{6n}$ of the multiplication circuit 42 is represented by the following equation.

$$S_{6n} = A\{1 + X_1 \cos(\omega_{c1}t + \phi)\} \cos\{\omega t - 2\phi + X_1 \sin(\omega_{c1}t + \phi) - X_2 \sin(\omega_{c2}t - \phi)\} \quad (18)$$

The output signal $S_{8n}$ of the addition circuit 44 from Eqs. (15) and (18) becomes as represented by the following equation.

$$S_{8n} = A\{1 + X_1\cos(\omega_{c1}t + \phi)\} \cdot \beta\sin\omega t \quad (19)$$
$$+ A\{1 + X_1\cos(\omega_{c1}t + \phi)\} \cdot \alpha\cos\omega t$$
$$= A\{1 + X_1\cos(\omega_{c1}t + \phi)\} \sqrt{\alpha^2 + \beta^2} \cdot \sin(\omega t + \theta)$$

Where, $\beta = \cos\phi + \sin 2\phi + X_1\sin(\omega_{c1}t + \phi)(\sin\phi - \cos 2\phi)$
$+ X_2\sin(\omega_{c2}t - \phi) \cdot \cos 2\phi$
$\alpha = \sin\phi + \cos 2\phi + X_1\sin(\omega_{c1}t + \phi) \cdot (\sin 2\phi - \cos\phi)$
$- X_2\sin(\omega_{c2}t - \phi) \cdot \sin 2\phi$ Accordingly, the noise in the output signal $S_{10n}$ of the detection circuit 46 under the various special conditions becomes as follows under the condition that $X_1^2$, $X_2^2 \ll 1$.

(1) When $\phi = 0$ ($i_B = i_R = i$), $$\sqrt{\alpha^2 + \beta^2} = \sqrt{2}\ (1 + \tfrac{1}{2} X_2\sin\omega_{c2}t - X_1\sin\omega_{c1}t) \quad (20)$$

$$S_{10n} = \sqrt{2}\ A\{1 + \sqrt{2}\ X_1 \cdot \sin(\omega_{c1}t + p) + \tfrac{1}{2} X_2\sin\omega_{c2}t\}$$

Hereinafter, the noise in the fundamental wave component band will be designated by $n_1$, and the noise in the second harmonic wave component band will be designated by $n_2$. Then, the noise in $S_{10n}$, from Eq. (20), becomes $$n = 2n_1 + \sqrt{2}n_2 \quad (21)$$

Therefore, the total noise N when $n_1 = n_2$ becomes as follows.

$$N = \sqrt{(2n_1)^2 + (\sqrt{2}n_2)^2} = \sqrt{6}n \quad (22)$$

Here, as set forth hereinbefore, the signal amplitude S of $S_{10n}$ is $\sqrt{6}$, whereby the noise to signal ratio N/S when $n_1 = n_2$ becomes as follows.

$$N/S = n \quad (23)$$

(2) When $\phi = 30°$ ($i_R = 0$, $i_B = i$), $$\sqrt{\alpha^2 + \beta^2} =$$
$$\sqrt{\frac{\{1 - \sqrt{3}\ X_2\sin(\omega_{c2}t - \phi)\}^2 + \{3 + \sqrt{3}\ X_2\sin(\omega_{c2}t - \phi)\}^2}{2}}$$

Since $S_{10n}$ is the amplitude component of Eq. (19), $S_{10n}$ becomes as follows.

$$S_{10n} = 2A\{1 + X_1 \cos(\omega_{c1}t + 30°)\} \quad (24)$$

Consequently, the noise component n from Eq. (24) becomes $2n_1$, whereby the total noise N also becomes $2n_1$. On one hand, since the signal amplitude of $S_{10n}$ is 2, as mentioned before, the noise-to-signal ratio N/S becomes $n_1$.

(3) When $\phi = -30°$ ($i_R = i$, $i_B = 0$), $\sqrt{\alpha^2 + \beta^2}$ is zero.

Therefore N becomes zero.

From the foregoing considerations, it is apparent that, in the present embodiment of the invention, no noise of the second harmonic wave component, whatsoever, appears when the lights of the other two primary colors (red and blue), which are not transmitted through the filter stripe $F_1$ transmitting green light, are being picked up by the camera. Furthermore, in comparison with the N/S ratio resulting from an analysis similar to that in the case of demodulation by envelope detection as shown in FIG. 4, in the present embodiment of the invention, there is an improvement of the order of +5 dB when $n_1 = n_2$.

Actually, $n_1 < n_2$, and, whereas the effect of $n_1$ and $n_2$ was 1:1 in the above mentioned proposed apparatus, in the present embodiment of the invention, the effect of $n_2$ can be reduced to 1:0.7 when white light or magenta light is being picked up. Furthermore, the effect of $n_2$ becomes zero at the time of monochromatic image pick-up of blue light or red light. In addition, at the time of this monochromatic pick-up, in a channel where one signal S is zero, noise N also becomes zero. For this reason (in the above case (3) where $\phi = -30°$), an improvement in total of +5 dB or more is obtained.

Still another advantageous feature of the present embodiment of the invention is that the amplitude component of the second harmonic wave component signal $S_3$ is amplitude limited by the amplitude limiter 41 and thereby prevented from being used, and only the phase component is used to carry out color demodulation. For this reason, the occurrence of color shading is determined by only the signal $S_2$, and a good picture quality is obtained.

In the apparatus illustrated in FIG. 7, the band-pass filter 43 may be omitted, and a band-pass filter for passing the fundamental wave component signal from the output signal of the addition circuit 44 and a band-pass filter for passing the fundamental wave component signal from the output signal of the subtraction circuit 45 may be provided.

Figures 9, 10:
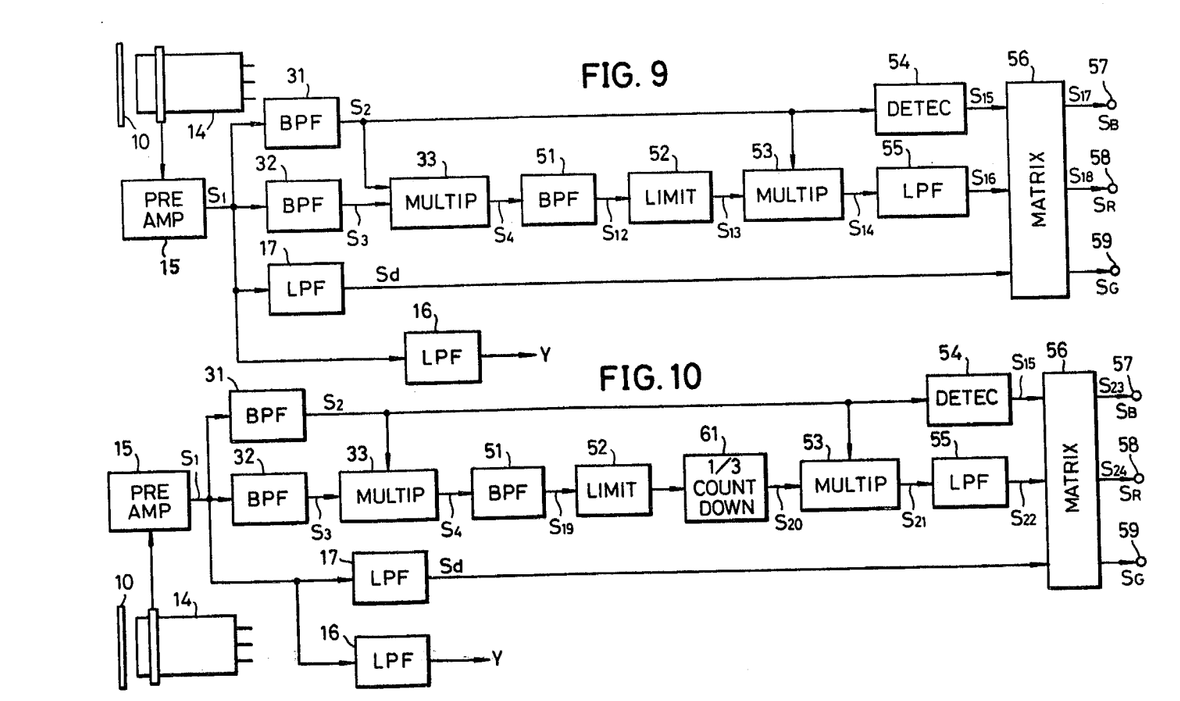
FIGS. 9 and 10 are block diagrams respectively showing second and third embodiments of the color television signal generating apparatus according to the invention.

The second embodiment of the apparatus of the invention will now be described with reference to the block diagram in FIG. 9. In FIG. 9, those parts which are same as corresponding parts in FIG. 6 are designated by like reference numerals. Description of such parts will be omitted. The signal S4 represented by Eq. (4) which has been led out from the multiplication circuit 33 is passed through a band-pass filter 51 which separates and filters only the fundamental wave component signal of the frequency $f_1$ and frequencies in the vicinity thereof and is supplied to an amplitude limiter 52, where it is limited to a specific constant amplitude.

The output signal $S_{12}$ of the band-pass filter 51 and the output signal $S_{13}$ of the amplitude limiter 52 are represented by the following equations.

$$S_{12} = \frac{A^2}{4} \cos(\omega t - 2\phi) \quad (25)$$

$$S_{13} = \cos(\omega t - 2\phi) \quad (26)$$

The output signal $S_{13}$ of the amplitude limiter 52 is multiplied by the output signal $S_2$ of the band-pass filter 31 in a multiplication circuit 53, and the resulting product signal is supplied to a low-pass filter 55, where its second harmonic wave component is removed. The output signal $S_{14}$ of the multiplication circuit 53 and the output signal $S_{16}$ of the low-pass filter 55 are respectively represented by the following equations.

$$S_{14} = \sqrt{\frac{3}{2}} (i_B + i_R)\{\sin(2\omega t - 2\tan^{-1}X) + \sin(2\tan^{-1}X)\} + \frac{1}{2}(i_B - i_R)\{\cos(2\omega t - 2\tan^{-1}X) + \cos(2\tan^{-1}X)\} \quad (27)$$

$$S_{16} = \sqrt{3}(i_B + i_R)\sin(2\tan^{-1}X) + (i_B - i_R)\cos(2\tan^{-1}X) \quad (28)$$

$$= \frac{(i_B - i_R)(2i_B^2 + 2i_R^2 + 5i_Bi_R)}{2(i_B^2 + i_R^2 + i_Bi_R)}$$

In Eqs.(27) and (28), $X = \dfrac{i_B - i_R}{\sqrt{3}(i_B + i_R)}$.

The output signal $S_{16}$ of the above mentioned low-pass filter 55 is supplied, together with the detection output signal $S_{15}$ of a detection circuit 54 for detecting the output signal $S_2$ of the band-pass filter 31, to a matrix circuit 56, where the sum signal and the difference signal of the two signals $S_{15}$ and $S_{16}$ are formed. More specifically, the detection output signal $S_{15}$ becomes as indicated by the following Eq. (29) from Eqs. (1) and (2). Furthermore, output signals $S_{17}$ and $S_{18}$ led out through output terminals 57 and 58 from the matrix circuit 56 are respectively as indicated in the following Eqs. (30) and (31).

$$S_{15} = (i_B^2 + i_R^2 + i_Bi_R)^{\frac{1}{2}} \quad (29)$$

$$S_{17} = S_{15} + S_{16} = \begin{cases} 2i_B & (i_R = 0, i_B = 1) \\ 0 & (i_R = 1, i_B = 0) \\ 1.732i_B & (i_B = i_R = 1) \end{cases} \quad (30)$$

$$S_{18} = S_{15} - S_{16} = \begin{cases} 0 & (i_R = 0, i_B = 1) \\ 2i_R & (i_R = 1, i_B = 0) \\ 1.732i_R & (i_B = i_R = 1) \end{cases} \quad (31)$$

As a result, the signal $S_{17}$ is led out as a blue signal SB through the output terminal 57, while the signal $S_{18}$ is led out as a red (R) signal SR through the output terminal 58. In the case of the present embodiment of the invention, the output levels of the signals $S_{17}$ and $S_{18}$ at the time when a white light or a magenta light is being picked up become lower than those at the time of pick up of a monochromatic light of blue light or red light, which is opposite to the relationship in the preceding first embodiment of the invention, as will be apparent from Eqs. (30) and (31), whereby no problem arises in actual practice.

The third embodiment of the apparatus of the invention will now be described with reference to the block diagram in FIG. 10. In FIG. 10, those parts which are the same as corresponding parts in FIG. 9 are designated by like reference numerals. Description of such parts will not be repeated. The output signal $S_4$ of the multiplication circuit 33 is supplied to the band-pass filter 51, where a frequency component which is three times the aforementioned space frequency $f_1$ is separated from the signal $S_4$. The resulting signal $S_{19}$ is rendered into a signal of continually constant amplitude by the amplitude limiter 52, which signal is supplied to a ⅓ count-down circuit 61. From Eq. (4), the above mentioned signal $S_{19}$ is represented by the following equation.

$$S_{19} = -\frac{A^2}{4} \cos 3\omega t \quad (32)$$

The ⅓ count-down circuit 61 counts down by ⅓ the signal thus supplied thereto, and the signal $S_{20}$ thus counted down is supplied to the multiplication circuit 53, where it is multiplied by the signal $S_2$ from the band-pass filter 31. Here, the signal $S_2$ is expressed by the following equation.

$$S_{20} = \cos \omega t \quad (23)$$

From Eqs. (30) and (2), the output signal $S_{21}$ of the multiplication circuit 53 becomes as follows.

$$S_{21} = \frac{A}{2}\{\sin(2\omega t - \phi) - \sin \phi\} \quad (34)$$

The output signal $S_{21}$ of the multiplication circuit 53 is passed through the low-pass filter 55, where its second harmonic wave component is removed, and is thus rendered into a signal $S_{22}$, which is supplied together with the output detected signal $S_{15}$ of the detection circuit 54 to the matrix circuit 56. From Eq. (34), the signal $S_{22}$ becomes as follows.

$$S_{22} = -\frac{A}{2} \sin \phi \quad (35)$$

$$= \frac{1}{2}(i_B^2 + i_R^2 + i_Bi_R)^{\frac{1}{2}} \cdot \left( \pm \sqrt{\frac{X^2}{1 + X^2}} \right)$$

Where, $X = \dfrac{i_B - i_R}{\sqrt{3}(i_B + i_R)}$

The above mentioned matrix circuit 56 carries out the operations of obtaining the sum and difference of the signal $S_{15}$ expressed by Eq. (29) and a signal which results when the signal $S_{22}$ expressed by Eq. (35) is increased four times in level. As a result, the matrix circuit 56 produces as output signals $S_{23}$ and $S_{24}$ through output terminals 57 and 58. Accordingly, the output signals $S_{23}$ and $S_{24}$ respectively become as follows.

$$S_{23} = S_{15} + 4S_{22} = \begin{cases} 2i_B & (i_R = 0, i_B = 1) \\ 0 & (i_R = 1, i_B = 0) \\ 1.732i_B & (i_R = i_B = 1) \end{cases} \quad (36)$$

$$S_{24} = S_{15} - 4S_{22} = \begin{cases} 0 & (i_R = 0, i_B = 1) \\ 2i_R & (i_R = 1, i_B = 0) \\ 1.732i_R & (i_R = i_B = 1) \end{cases} \quad (37)$$

In this manner, the signals $S_{23}$ and $S_{24}$ are respectively led out separately from the output terminal 57 as a blue signal SB and from the output terminal 58 as a red signal SR.

In each of the above described embodiments of the invention, the separated and led out blue signals $S_{10}$, $S_{17}$, and $S_{23}$ and red signals $S_{11}$, $S_{18}$, and $S_{24}$ are respectively supplied to the matrix circuit. In the matrix circuit, these signals are matrixed with $(i_G + \frac{2}{3}i_B + \frac{1}{3}i_R)$ of direct (DC) signals (three primary color mixture signals) extracted from the aforementioned signal $S_1$ by the low-pass filter 17 having the frequency pass-band width indicated by curve V in FIG. 5. Thus, the three primary color signals SR, SG, and SB of red, green, and blue are obtained.

Further, this invention is not limited to these embodiments but various variations and modifications may be made without departing from the scope of the invention.

What we claim is:

1. A color television signal generating apparatus comprising:
    a color-resolving striped filter comprising a plurality of groups of filter stripes, said groups being disposed in parallel and consecutively in a sequentially repeated arrangement, each of said groups comprising at least three filter stripes from among,
    a first filter stripe having a light transmission characteristics for transmitting the light of one of the three primary colors of an addition mixture color,
    a second filter stripe having a light transmission characteristic for transmitting the light of a mixed color which includes the primary color transmitted through said first filter stripe and one of the other two primary colors, and
    a transparent third filter stripe for transmitting white light,
    said at least three filter stripes being arranged in parallel and consecutively in a specific sequence;
    a camera tube having said color-resolving striped filter disposed on the front surface thereof and producing a superimposed output signal comprising, in superimposition:
    a direct wave signal containing signals of the three primary colors in said addition mixture color, and
    a high-band signal component comprising a group of modulated color signals resulting from an amplitude modulation of a carrier wave by the signals of two primary colors other than the primary color of the light transmitted through said first filter stripe, said carrier wave having a frequency equal to a space frequency determined by the number of said groups of filter stripes, and said carrier wave also having frequency components which are higher harmonics of the frequency of said carrier wave;
    a first separation means for separating and deriving, out of the output signal of the camera tube, a fundamental wave component signal in which the carrier wave having the frequency equal to the space frequency is amplitude modulated;
    a second separation means for separating and deriving, out of the output signal of the camera tube, a second harmonics wave component signal in which a carrier wave having a frequency twice the space frequency is amplitude modulated;
    a multiplication means for multiplying the output signals of the first and second separation means;
    means for separating and deriving signals of two primary colors other than the primary color transmitted through the first filter stripe, responsive to the output signals of the multiplication means and the first separation means;
    separation means for separating said direct wave signal from the output signal of said camera tube; and
    matrix means, responsive to said output direct wave signal and said output signals of said two primary colors, for producing three primary color output signals.

2. A color television signal generating apparatus as claimed in claim 1 in which said first and second separation means comprises, respectively, first and second band-pass filters.

3. A color television signal generating apparatus as claimed in claim 1 which further comprises an amplitude limitting means for limiting an amplitude of the output signal of the second separation means, the output signal of the amplitude limitting means being supplied to the multiplication means, and in which said means for separating and deriving the signals of the two primary colors comprises an adding means for adding the output signal of the first separation means and the output signal of the multiplication means with each other and deriving a fundamental wave component signal, a subtracting means for subtracting the output signal of the first separation means and the output signal of the multiplication means with each other and deriving a fundamental wave component signal, a first detecting means for detecting the output signal of the adding means and deriving a signal of one of the two primary colors other than the primary color transmitted through the first filter stripe, and a second detecting means for detecting the output signal of the subtracting means and deriving a signal of the other one of said two primary colors, the output signals of said first and second detecting means being supplied to said matrix means.

4. A color television signal generating apparatus as claimed in claim 3 which further comprises a band-pass filter means for passing a fundamental wave component signal out of the output signal of the multiplication means, the output signal of the band-pass filter means being supplied to the adding means and subtracting means.

5. A color television signal generating apparatus as claimed in claim 1 which further comprises an amplitude limitting means for limiting an amplitude of the output signal of the multiplication means, and in which said means for separating and deriving the signals of the two primary colors comprises a second multiplication means for multiplying the output signal of the first separation means and the output signal of the amplitude limitting means, a detecting means for detecting the output signal of the first separation means, and low-pass filter means for deriving only a signal having a frequency band lower than the frequency band of said high-band signal out of the output signal of the second multiplication means, the output signals to said detecting means and said low-pass filter means being supplied to said matrix means.

6. A color television signal generating apparatus as claimed in claim 5 which further comprises means for frequency counting down the output signal of the amplitude limitting means and for supplying the resulting frequency counted down signal to the second multiplication means.

7. A color television signal generating apparatus as claimed in claim 5 in which further comprises a band-pass filter means for passing a fundamental wave component signal out of the output signal of the multiplication means and for supplying the passed fundamental wave component signal to the amplitude limiting means.

* * * * *